3,314,758
PRODUCTION OF VITREOUS SILICA IN A
ROTARY KILN
Robert K. Scott, Pittsburgh, Donald O. McCreight, Bethel Park, Edward Einstein, Homestead, and Clyde L. Thompson, Pittsburgh, Pa., assignors to Harbison-Walker Refractories Company, Pittsburgh, Pa., a corporation of Pennsylvania
No Drawing. Filed Aug. 26, 1964, Ser. No. 392,320
10 Claims. (Cl. 23—182)

The present invention relates to the production of vitreous silica, particularly its production in a rotary kiln and at temperatures below the true melting point of silica.

Vitreous silica is a highly desirable refractory material because of its great thermal shock resistance, which is attributable to its very low rate of reversible thermal expansion.

The phase transformations of silica are numerous but stated in their simplest form; the major modifications (allotropic phases) are quartz, tridymite, cristobalite, and fused silica, which is non-crystalline silica or silica glass normally produced by fusion and quenching. There are many aspects governing the transformation of one to the other, but in highly simplified form, the equilibrium ranges are as follows:

| | Range of stability |
|---|---|
| Quartz | Room temperature to 870° C. (1598° F.). |
| Tridymite | 870° C. to 1470° C. (2678° F.). |
| Cristobalite | 1470° C. to 1725° C. (3140° F.). |
| Cristobalite melts to form fused silica at 3140° F. | |

Each of the major crystalline phases, quartz, tridymite, and cristobalite, has two or more forms with their own stability relationships, but these need not be discussed here. The most complete literature reference to this subject is the book, "The Properties of Silica," by Robert B. Sosman, published as an American Chemical Society monograph by the Chemical Catalog Company, Inc. (1927).

To illustrate the complexity of the phase relationships existing between the various forms of silica, one example might be given: On heating quartz, which is the form of silica most abundant in nature, its inversion does not necessarily proceed quartz→tridymite→cristobalite; it is far more usual for tridymite to be at least temporarily bypassed and for the quartz to be converted, first to cristobalite and thereafter (if at all) in some degree to tridymite. This reluctance to form tridymite in its equilibrium range is related to the fact that the presence of a flux is required, to bring about its direct formation from quartz.

We have observed, through mineralogic studies involving the X-ray, that when quartz is heated above its equilibrium range (1598° F.) an amorphous or disorganized state results, beginning at about 1250° C. (2282° F.), and that observable cristobalite does not develop until at a somewhat higher temperature. This observation will later be commented on more fully, in connection with our discovery of practical means for bringing about the formation of vitreous silica at low temperatures.

In theory, each of the three major crystalline forms of silica could have its own melting point; but this has chiefly been of interest to theoreticians since, in fact, the normal heating of quartz and tridymite results in the formation of cristobalite, which is the form of silica that melts to a liquid, and when cooled forms fused silica. In discussing these matters, Dr. Sosman uses such phrases, "The melting point of tridymite, if realizable . . .," and points out that, while in theory the melting point of quartz is probably below 2678° F., "This is not the temperature meant by the general expression, the melting point of silica. That expression refers to the melting of the high temperature stable form, cristobalite." Because of these relationships observed many times, such fusing of quartz to form fused silica, as has been practiced, has been accomplished at temperatures above 3140° F., the melting point of cristobalite, and with considerable difficulty. Fusing silica is an expensive process since the high temperatures required for melting have dictated, in general, the use of electric furnaces.

We have discovered that it is possible to produce material which is nearly all vitreous silica, having the properties of silica which has been fused, at a temperature lower than the melting point of cristobalite. We have accomplished this by heating quartz materials below the melting point of cristobalite, in a rotary kiln, at fast heating rates and under conditions which indicate we have commercially achieved the direct vitrification of quartz, without going through the cristobalite phase and without true melting. Thus, a means has been found of achieving an end, which has been theoretically possible but which has previously evaded prior workers.

We believe that our success results from our realization that, at temperatures in excess of 1250° C., quartz decomposes at a finite rate, not instantaneously, to the disorganized or amorphous state, the rate being determined by the crystal size and the temperature and, probably, also, by chemical composition, i.e., the nature and amount of impurities. The formation of cristobalite, from the disorganized or amorphous state, also proceeds at a rate dependent on temperature and chemical composition, which rate is somewhat different than the rate of decomposition of quartz. Both reactions appear to increase in rate with increasing temperature between 1250° C. and 1700° C., the former increasing more rapidly than the latter.

Thus, if we select a suitable raw material and temperature, so that the rate of decomposition of the quartz greatly exceeds the rate of cristobalite formation, and select the time of hold at temperature in the proper range, we are able to obtain nearly complete decomposition of quartz, with the formation of only a minor amount of cristobalite. If the largely amorphous mass be then rapidly cooled, the product remains vitreous and is similar in properties to quartz, which has been completely fused and rapidly cooled. The rotary kiln process allows the application of intense heat to all surfaces of the material as it tumbles, so that the formation of amorphous, or vitreous, silica has progressed to a high degree, before a large amount of cristobalite is formed.

It is an object of the present invention to provide a vitreous silica aggregate containing up to 15%, by weight, of cristobalite.

Another object of the invention is to produce vitreous silica in a more simple, economical, and efficient manner than was heretofore possible.

A further object of the invention is to produce vitreous silica in a rotary kiln at a temperature lower than the melting point of cristobalite.

Other objects of the invention will appear hereinafter.

Briefly, in accordance with one embodiment of the present invention, the novel process includes charging the silica raw material to a rotary kiln, heating it continuously and rapidly (i.e. at a rate of at least about 25° F. per minute) to a temperature of about 2900° F. to 3100° F., holding the material thereat for a period of about ½ to 1½ hrs., then cooling the resulting product to a temperature below about 2000° F. rapidly, preferably, at a rate of about 200° F. per minute and recovering a vitreous silica aggregate.

A preferred raw material, for processing according to the teachings of the invention, is a sedimentary quartzite occurring naturally in massive form, having an average crystallite diameter of about 10 microns and less, preferably between 5 and 10 microns, and containing negligible intercrystalline material. A preferable useable silica raw material contains at least 99% SiO₂, on an oxide basis. Such a silica raw material may be found, for instance, in Arkansas, Illinois, and California and has the following typical chemical analysis:

| | Percent |
|---|---|
| $SiO_2$ | 99.2 |
| $Fe_2O_3$ | 0.10 |
| $Al_2O_3$ | 0.14 |
| CaO | 0.05 |
| $TiO_2$ | 0.01 |
| MgO | 0.03 |
| Alkalies | 0.27 |
| Ignition loss | 0.20 |

In practice, the quartzite material is subjected to a light crush, after removal from the mine, to provide lumps averaging about ½" to 2" in diameter. Uniformity of feed sizing is desirable, in order to maintain a uniform rate of flow of the material through the rotary kiln. The crushed rock may be fed to the kiln by any suitable means. The material is subjected to the burning zone of the kiln, which is maintained at a temperature of between 2900 to 3100° F. Although the temperature at which cristobalite melts was given previously to be about 3140° F., vitreous silica will form at about 2900° F. after a period of about ½ hr., when the material is subjected to this temperature without substantial preheating. The temperature of the charge material must be kept below the melting point of cristobalite, and preferably below 3100° F., since above this temperature, the vitreous material being formed tends to become sticky and adheres to the walls of the kiln, so as to make it virtually inoperative. Also, it is important that the rock does not have a residence time at these temperatures exceeding about 1½ hrs., since some of the vitreous silica may devitrify and form cristobalite. After the prescribed period of residence of the material in the kiln, it is discharged from the kiln and rapidly cooled to a temperature below about 2000° F. in a period of the order of 5 minutes. Rapid cooling may be accomplished by subjecting the discharged material to a blast of cold air or by quenching the material in water. The latter method has been preferred since the aggregate is much easier to handle.

Batches, processed in accordance with the above process, have been analyzed after discharge and cooling from the kiln and have been found to consist primarily of vitreous silica aggregate, with only about 15%, by weight, cristobalite present and as little as 2%.

The following example illustrates more clearly the teachings of the present invention.

A sedimentary quartzite rock, having a typical chemical analysis mentioned previously, was shattered by impact blows to provide lumps ranging in diameter from ½" to 2". This material was fed to a rotary kiln having a reducing atmosphere, containing carbon monoxide, at a rate of about 8 tons per hr. The rate of rotation of the kiln was about 1½ revolutions per minute. The gas temperature at the feed end of the kiln was found to be about 600° F., and the burning zone of the kiln was maintained at obut 3020° F. The material was subjected to the burning zone temperatures for about 1½ hrs. After residence, the material was immediately discharged and quenched into a tank filled with water. X-ray analysis of the cooled aggregate indicated that vitreous silica was present in an amount in excess of 96%, and only 2% cristobalite was detected.

It is intended that the foregoing description be construed as illustrative and not in limitation of the invention.

Having thus described the invention in detail and with sufficient particularity as to enable those skilled in the art to practice it, what is desired to have protected by Leters Patent is set forth in the following claims.

We claim:
1. A method for continuously producing a vitreous silica aggregate containing no more than about 15% cristobalite, comprising continuously feeding a crystalline silica raw material occurring naturally in massive form having an average crystallite diameter of about 10 microns and less and containing negligible intercrystalline material to a rotary kiln, maintaining the hot zone temperature in the kiln above the equilibrium melting point of quartz but below the equilibrium melting point of silica, allowing the material to tumble downwardly through the kiln so as to allow the application of intense heat to all surfaces of the material, holding the material in said hot zone for a period not exceeding about one and one-half hours but sufficient to decompose the crystalline structure and provide a predominantly amorphous state in said material, moving the material from the hot zone and, then rapidly cooling it and recovering a vitreous silica aggregate containing no more than about 15% cristobalite.

2. The method of claim 1 in which the hot zone temperature of the rotary kiln is between about 2900 and 3100° F.

3. The method of claim 1 in which the material is held in the hot zone for a minimum period of about one-half hour.

4. The method of claim 1 in which the average diameter of the feed material is between about one-half inch and two inches.

5. The method of claim 1 in which the average crystallite diameter of the silica raw material is between about five and ten microns.

6. The method of claim 1 in which the vitreous silica aggregate contains between about 2 and 15% cristobalite.

7. The method of claim 2 in which the silica raw material is heated to a temperature between about 2900 and 3100° F. at a rate of about 25° F. per minute.

8. The method of claim 1 in which the silica raw material is cooled to a temperature below about 2000° F. at a rate of about 200° F. per minute.

9. The method of claim 1 in which the crystalline silica raw material contains at least 99% SiO₂, on an oxide basis.

10. A vitreous silica aggregate containing up to about 15% cristobalite produced by the method of claim 1.

References Cited by the Examiner

UNITED STATES PATENTS 2,970,925  2/1961  Dyckerhoff _____ 106—100

OTHER REFERENCES

C. Martinez: Chem. Abstracts, vol. 44, page 10280e, "Devitrification of Vitreous Silica."

C. Martinez: Annales Chim. [12], 1 (1946), pages 596–606 and pages 612 and 613.

J. Perry, edit., Chemical Engineers Handbook, 3rd edition (1950), pages 1608–1612.

V. Azbe: Rock Products, August 1946, vol. 49, pages 90 and 91.

Martinez, C.: Comptes Rendus, vol. 223, pages 612–614 (1946).

Martinez, C.: Comptes Rendus, vol. 223, pages 657–659 (1946).

OSCAR R. VERTIZ, *Primary Examiner.*

A. GREIF, *Examiner.*